United States Patent
Qian et al.

(10) Patent No.: US 7,450,549 B2
(45) Date of Patent: Nov. 11, 2008

(54) PILOT SIGNAL ENHANCEMENTS FOR A WIRELESS COMMUNICATION SYSTEM

(75) Inventors: Feng Qian, Mission Viejo, CA (US); Stanislaw Czaja, Cardiff, CA (US)

(73) Assignee: VIA Telecom Co., Ltd. (KY)

( * ) Notice: Subject to any disclaimer, the term of this patent is extended or adjusted under 35 U.S.C. 154(b) by 527 days.

(21) Appl. No.: 10/903,029

(22) Filed: Jul. 29, 2004

(65) Prior Publication Data

US 2005/0030926 A1 Feb. 10, 2005

Related U.S. Application Data

(60) Provisional application No. 60/494,942, filed on Aug. 12, 2003, provisional application No. 60/493,026, filed on Aug. 5, 2003.

(51) Int. Cl.
*H04J 3/16* (2006.01)
(52) U.S. Cl. .................. 370/337; 370/347; 370/321; 375/316; 455/69
(58) Field of Classification Search .......... 390/337, 390/347, 321; 375/316, 340, 315; 455/522, 455/69, 63.1; 370/342, 209, 337, 321, 347
See application file for complete search history.

(56) References Cited

U.S. PATENT DOCUMENTS

| | | | |
|---|---|---|---|
| 6,038,263 A | | 3/2000 | Kotzin et al. |
| 6,067,292 A | * | 5/2000 | Huang et al. ............ 370/342 |
| 6,148,045 A | * | 11/2000 | Taura et al. ............. 375/344 |
| 6,172,993 B1 | | 1/2001 | Kim et al. |
| 6,539,010 B1 | * | 3/2003 | Hagerman et al. ........ 370/347 |
| 6,987,746 B1 | | 1/2006 | Song |
| 2003/0050084 A1 | | 3/2003 | Damnjanovic et al. |
| 2003/0091022 A1 | * | 5/2003 | Blanz et al. ............. 370/350 |
| 2005/0020219 A1 | * | 1/2005 | Sih et al. ............... 455/130 |

OTHER PUBLICATIONS

"Medium Access Control (MAC) Standard for cdma2000 Spread Spectrum Systems", 3GPP2 C.S0003-D, Version 1.0, Release D, pp. 2-18, 2-172-2-173, and 2-180, Feb. 2004.
"Upper Layer (Layer 3) Signaling Standard for cdma2000 Spread Spectrum Systems", 3GPP2 C.S0005-D, Version 1.0, Release D, pp. 1-20, 2-320, 2-378, 3-561 and 3-969, Feb. 13, 2004.

* cited by examiner

*Primary Examiner*—Danh C Le
(74) *Attorney, Agent, or Firm*—Jaquez & Associates; Martin J. Jaquez, Esq.; William C. Boling, Esq.

(57) ABSTRACT

In a method and apparatus suitable to convey timely information for facilitating accurate reception of transmitted data, a pilot signal is modulated to convey information. The information may facilitate efficient interpretation of an associated traffic signal. Modulation of a pilot signal frame may be limited to ensure early detection, and/or to minimize impairment of pilot functionality. In one embodiment, a Secondary Pilot Channel (SPICH) is transmitted at one of several selectable power levels to boost effectiveness of a phase reference, and is modulated to indicate the selected level. Such timely information enables prompt optimal combining of the SPICH with a primary Pilot Channel (PICH), and/or permits processing efficiencies for an associated traffic channel. Pilot signal frames may be transmitted at a predetermined level during a detection preamble portion of a frame to ensure accurate and early detection, and at a more optimal level thereafter.

37 Claims, 4 Drawing Sheets

PILOT SIGNAL ENHANCEMENTS FOR A WIRELESS COMMUNICATION SYSTEM

CROSS REFERENCE TO RELATED APPLICATIONS

This application claims priority under 35 USC 119 to two U.S. Provisional Applications, both invented by Feng Qian and Stanislaw Czaja, and both entitled "Method and Apparatus for Boosting Pilot Channel Transmission Levels in a Wireless Communication System," including No. 60/493,026, filed Aug. 5, 2003, and No. 60/494,942, filed Aug. 12, 2003, the contents of which are hereby incorporated in their entirety by reference.

BACKGROUND

1. Field

This application generally relates to the field of wireless communication systems, and more particularly to enhancing data transmission efficiency in such communication systems.

2. Related Art

The subject matter set forth herein is applicable to wireless communication systems generally. However, it has been developed primarily in the context of cellular telecommunication systems, which facilitate high-speed connectivity and data and voice transport on both point-to-point and point-to-multipoint bases. First-generation (analog) and second-generation (digital) cellular networks were used primarily for communicating voice traffic via mobile cellular telephones, and thus maintained a focus on access methods for the efficient transport of voice information. With the rising popularity of the Internet, a third-generation (3G) wideband multimedia cellular network has been proposed that transports both voice and data at much higher speeds than were previously available using the first and second generation wireless networks.

A Third Generation Partnership Project 2 (3GPP2) has been established by industry groups for the purpose of defining specifications to transition current code-division multiple-access (CDMA) wireless networks to the third generation, which is commonly referred to as CDMA2000. One such specification may be referred to as "CDMA2000 1×Revision D" (which may also be referred to as "CDMA2000 1×Rev D," "cdma2000 Release D," "IS-2000-D", or "IS-2000-Rel. D"). The CDMA2000 1× Rev D specification, available from the 3GPP2, is incorporated by reference herein in its entirety for its teachings on communications protocols used in 3G wireless communications systems.

Recently, many proposals of communication protocols for use in CDMA2000 Release D have been submitted to the 3GPP2, including protocols for both forward link transmissions from a base station (BS) to a mobile station (MS), and for reverse link transmissions from an MS to a BS. Most of the proposals pertaining to reverse communications links for use in cdma2000 Release D communication systems recommend a pilot channel transmission level "boosting" scheme using a Reverse Secondary Pilot Channel (R-SPICH).

The R-SPICH is a pilot channel that is additional to a primary reverse pilot channel (R-PICH), and which may be used in CDMA2000 Release D systems to aid in decoding of the new high-speed reverse packet data channel (R-PDCH). It is generally preferred to transmit the R-PICH at the same levels that were employed according to previous releases, thus maintaining backward compatibility. The R-SPICH is not burdened with backward compatibility limitations. As such, transmission power levels of the R-SPICH may be made variable, based for example on the data rates of the reverse packet data channels (R-PDCH) with which they are associated. Thus, the R-SPICH may be combined with the R-PICH to enhance, in steps, the precision of a coherent demodulation phase reference that is formed by combining the R-PICH and the R-SPICH, yet without jeopardizing compatibility with system components that have been configured in accordance with earlier releases of the standard.

Because transmission power on one CDMA channel appears as noise on other channels, it is generally desirable to transmit at the lowest power that will achieve adequate reception accuracy. The optimal transmission level of an R-SPICH depends upon the data rates and channel conditions of the data channel(s) with which it is associated. The associated data channels may achieve higher data rates by employing more efficient coding schemes and modulation techniques. Corresponding improvements in the accuracy of the channel estimates, the phase reference, and/or the data signal estimate, can facilitate demodulation and decoding at such increased code densities.

A transmitting MS may determine a rate at which to transmit data, and may select transmission characteristics, such as coding and/or modulation techniques, to achieve the selected data rate. To support accurate reception, the MS may also select an appropriate transmission level for the R-SPICH. Selection of these factors by the transmitting MS requires less signaling overhead than, for example, requiring a sequence of communications by which the receiving BS grants permission to the MS to employ such factors. However, in order to achieve optimal combining of the R-SPICH and the R-PICH, the receiving BS should acquire information regarding the transmission level of the R-SPICH, as compared to the R-PICH level.

Various recommendations have been proposed to the 3GPP2 for conveying R-SPICH transmission level information to the BS, but each has one or more drawbacks. One proposal recommends transmitting information to indicated relative transmission levels of the SPICH in a companion signal channel. Disadvantageously, this requires an additional signal channel, or imposes a data burden on an existing signal channel; moreover, combining can then only be performed after the control channel is decoded, which can delay the combining process for at least four power control group (PCG) time periods, or a time period of 4 (1.25 ms). Another proposal suggests that information be transmitted ahead of time or based on a previously transmitted frame. Disadvantageously, error propagation of incorrectly detected rate information can occur using this approach, and the information may also be stale, or at least not optimally up-to-date. Another proposal recommends that the SPICH channel not be multi-level, but rather be either on or off, with nearly "real-time" SPICH detection. Disadvantageously, a single SPICH transmission level fails to efficiently match the anticipated wide range of data rates and channel conditions. Such coarse SPICH levels will either be suboptimal for the highest data rates, or will waste system resources when employed with intermediate data rates.

In order to efficiently boost overall pilot effectiveness by adding a secondary pilot channel, the first and second pilot channels should be combined. According to mathematics well known to those of skill in the art, the signals may be more optimally combined if a ratio of the power at which the two pilots are transmitted is known at the receiver. Moreover, in order to achieve optimal decoding, the Traffic to Pilot ratios (T/P, also referred to as "TPR") should also be known. Each of the proposed methods described above exhibit some limitations in achieving optimal T/P ratios, in reducing the complexity of the receiver (due to information latency for BS optimal combining), or in achieving robust error tolerance.

Therefore, a need exists for a method and apparatus for boosting pilot channel transmission levels in a wireless communication system that overcomes the disadvantages of the previously proposed approaches. The disclosed enhancements address this need with techniques that are broadly applicable in many types of wireless systems to provide modest amounts of timely data, and which may be particularly useful to facilitate data reception in a system having variable transmission characteristics.

SUMMARY

A method and apparatus are disclosed for enhancing the usefulness or effectiveness of a pilot channel in a wireless communications system. A pilot signal concurrently conveys new data to a receiver, and serves to establish a phase reference for coherent demodulation of an associated traffic channel. In a preferred embodiment, two pilot channels are variably transmitted to enhance the effectiveness of the combined pilots as a phase reference.

A method of transmission provides a pilot channel for establishing a phase reference for coherent demodulation of an associated traffic channel, and modulates the pilot channel to concurrently convey previously unknown data to the receiver. The modulation may be limited as to type (e.g., BPSK or QPSK), or may be maintained consistent throughout pilot signal frames except for conformance to receiver expectations. Modulation changes that reflect new data may be limited to a maximum number of as few as one or two during each pilot signal frame, or may be limited to an initial portion of each pilot signal frame. To best benefit from timeliness, the information conveyed by modulation of the pilot channel may be restricted to information that serves to facilitate demodulation, decoding, or other conversion of an associated traffic channel signal into data. The pilot channel may be a Secondary Pilot Channel (SPICH) transmitted at a selected one of a finite number of power levels. The SPICH may be modulated by Quadrature Phase-Shift Keying (QPSK) to convey the information, and may be transmitted at a level that is selected from a limited set of boosting levels, as indicated by the QPSK modulation symbol. During an initial portion, or detection preamble, a SPICH signal frame may be transmitted at a predetermined transmission level to enhance a probability of detection and of proper SPICH information decoding.

A method of receiving includes employing, for coherent demodulation of an associated traffic channel, a portion of a pilot signal that has been modulated to convey new information. The method may include determining information conveyed by modulation of a pilot signal frame prior to receiving an entirety of the pilot signal frame, or employing a portion of a pilot signal frame to establish a phase reference prior to receiving an entirety of the pilot signal frame. The method may include analyzing modulation of pilot signal frames for new information only during initial portions of such pilot signal frames, or analyzing each pilot signal frame for a limited number of modulation changes that reflect new information, where the limit may be as small as one or even zero changes during each pilot signal frame in order to minimize degradation of pilot signal effectiveness for establishing a phase reference. The method may include limiting use of information determined from the pilot signal to facilitate demodulation, decoding, or other conversion of an associated traffic channel into corresponding data. The pilot channel may be a Secondary Pilot Channel (SPICH), and the method may include combining the SPICH with a primary Pilot Channel (PICH). Modulation of the SPICH may be analyzed to determine relative transmission levels of the SPICH and PICH, and the SPICH and PICH may be optimally combined on the basis of such relative transmission levels. The SPICH may be modulated by Quadrature Phase-Shift Keying (QPSK) to convey the information, and may be transmitted at a level that is selected from a pre-determined set of boosting levels, as indicated by the QPSK modulation symbol. An initial portion, or detection preamble, of a SPICH signal frame may be optimally combined with a corresponding portion of a PICH signal frame according to a predetermined transmission level ratio that is not indicated by modulation of the SPICH signal frame.

The enhancements taught herein will improve performance in a wide range of systems. When implemented in a CDMA system, they may overcome shortcomings of the prior art while maintaining benefits of earlier proposals.

BRIEF DESCRIPTION OF THE DRAWINGS

Embodiments of the disclosed method and apparatus will be more readily understood by reference to the following figures, in which like reference numbers and designations indicate like elements.

DETAILED DESCRIPTION

Overview

A pilot channel (PICH) in a CDMA system is typically a non-data-bearing spread spectrum signal employed to enable a receiver to acquire the timing of one or more associated data-bearing (traffic) signal channels, and to provide a phase reference for coherent demodulation of such associated traffic channels. According to prior art, a PICH should not be modulated because modulation would degrade the ability to determine timing and phase information from the PICH. However, the teachings below show that information can be advantageously conveyed by modulating a pilot channel (particularly, in some embodiments, a secondary pilot channel or SPICH). This may be particularly useful, for example, when the value of a modest amount of information, if received in a timely fashion, exceeds the slight penalties imposed by variable modulation of the pilot signal.

Figure 1:
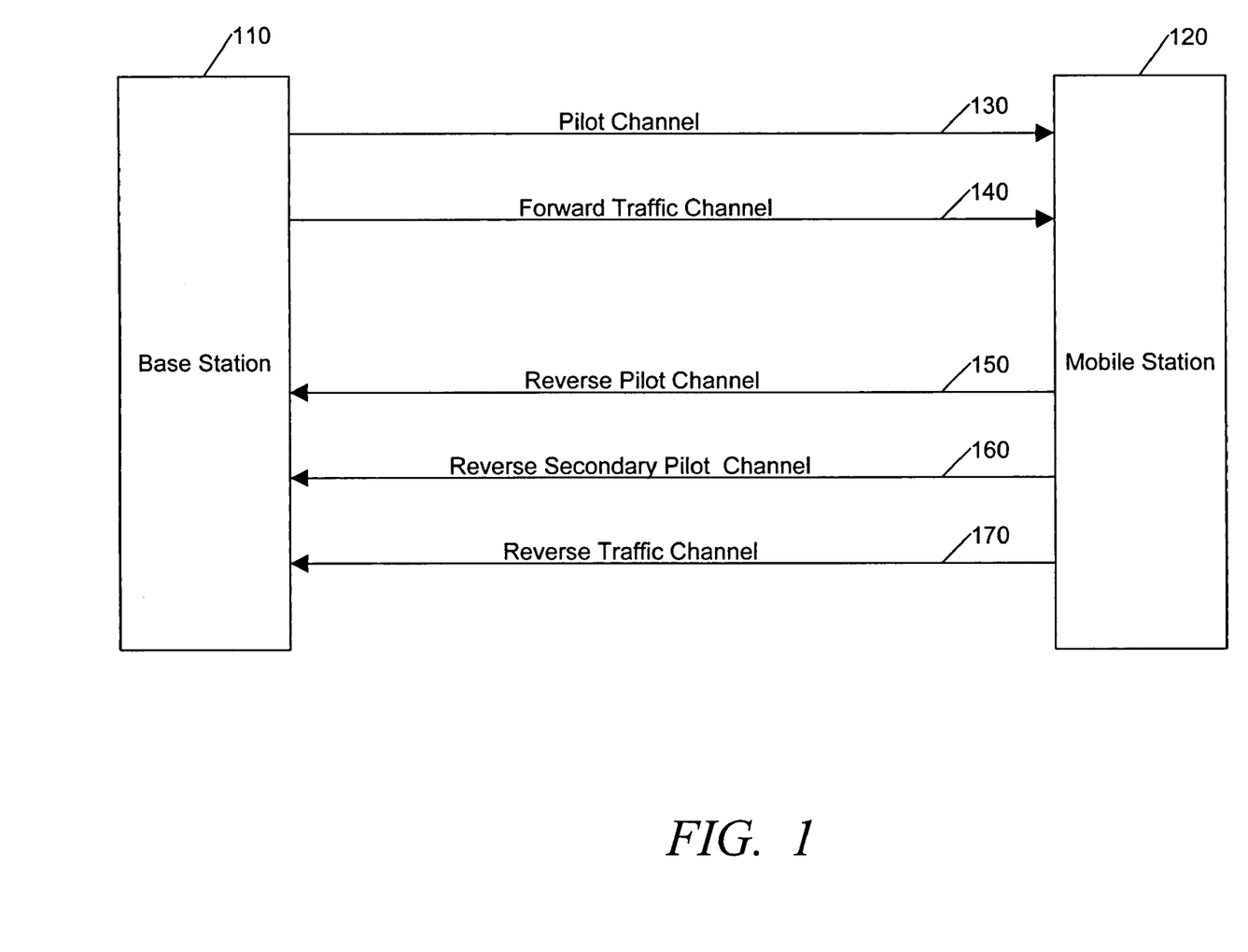
FIG. 1 is a simplified block diagram showing selected communication channels between a base station and a mobile station.

FIG. 1 is a simplified block diagram of a wireless communication system showing a base station (BS) 110 and a mobile station (MS) 120. For simplicity, only a single BS 110 and MS 120 are shown. Likewise, only selected communication channels are shown. Persons skilled in the art of wireless communications will understand that the present teachings encompass a plurality of BSs and MSs, as well as numerous different channel configurations.

The signals R-PICH 150, R-SPICH 160, and reverse traffic channel 170 are shown in FIG. 1 as being in parallel. However, this does not imply that the channels are temporally concurrent, or distinguished only by concurrent techniques such as code division multiplexing (CDM) or frequency division multiplexing (FDM). Rather, a plurality of these channels may also be disposed in nonconcurrent time slots of a common carrier signal, and distinguished by time division multiplexing (TDM) techniques. Thus, in general, the channels referred to herein may be distinguished by any one, or any combination, of CDM, TDM, or FDM methods, or by any other techniques for distinguishably segregating signal channels.

The BS 110 transmits a Pilot Channel (PICH) 130, which may also be referred to as the forward PICH. When the BS 110 is communicating with a selected MS, such as the MS 120, one or more forward traffic channels, such as the forward traffic channel 140, may also be transmitted to the selected MS 120, and/or to other MSs (not shown). The forward traffic channel 140 may convey voice or data information. Other communication channels (not shown) are also employed in CDMA2000 and other wireless communication systems.

The MS 120 may transmit information to the BS 110 via one or more channels. These channels need not be directed exclusively to the BS 110, and the MS 120 may concurrently transmit information to other receivers via one or more other channels. The reverse traffic channel 170 may include voice or data information. An example of the reverse traffic channel 170 that is described in CDMA2000 Release D systems is a high-speed reverse packet data channel (R-PDCH). The reverse traffic channels from MSs may be distinguished from each other by any combination of CDM, TDM, FDM, or other appropriate techniques.

When the MS 120 is transmitting reverse traffic information via the reverse traffic channel 170, it may also transmit one or more reverse pilot channels (R-PICHs), such as the R-PICH 150 and the reverse secondary pilot channel (R-SPICH) 160. The R-PICH 150 and the R-SPICH 160 aid the BS 110 in decoding the reverse traffic channel 170 by providing phase and synchronization information as required. Other communication channels (not shown) may also be employed.

Figure 2:
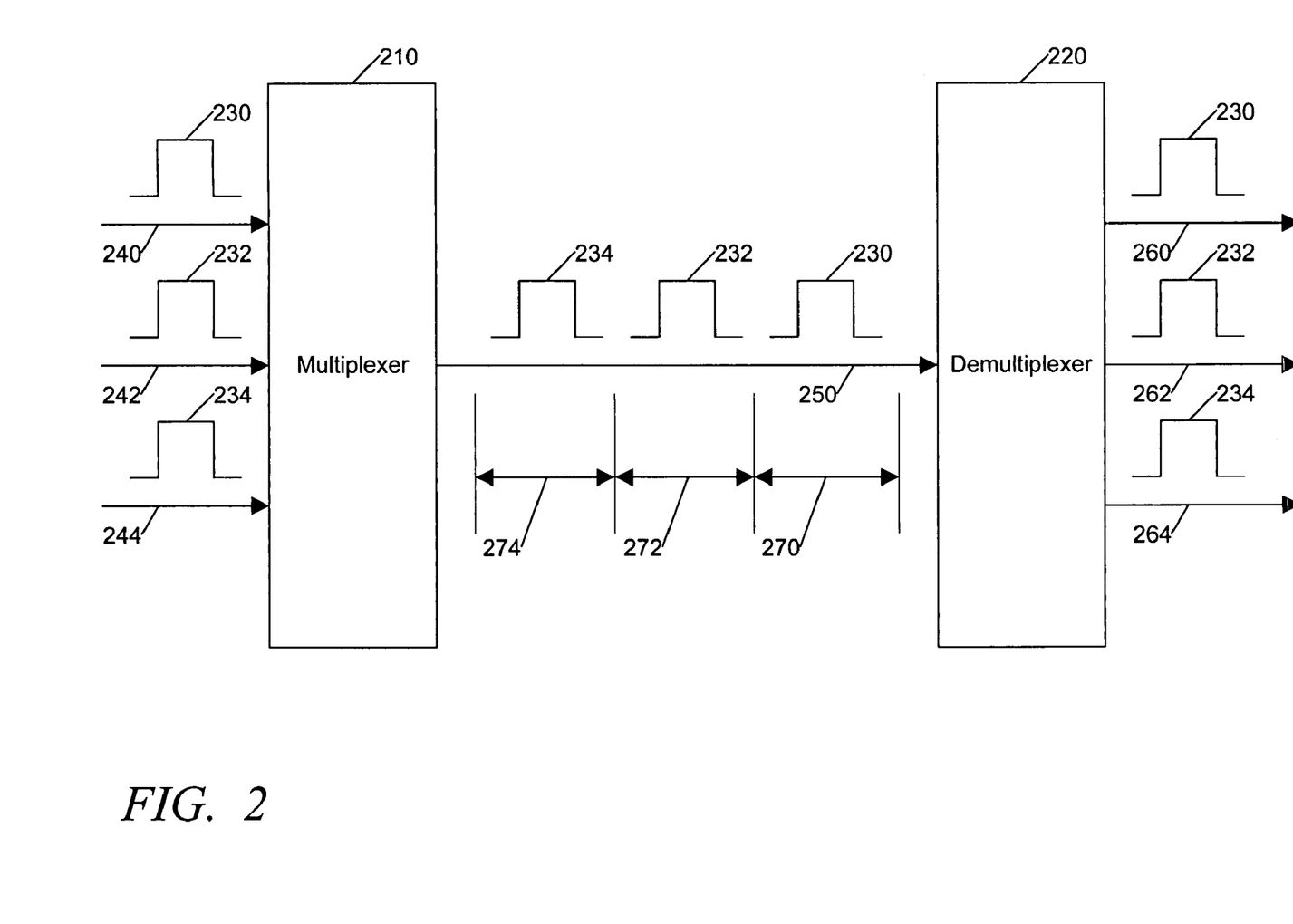
FIG. 2 illustrates an example of a method of time division multiplexing of communication packets.

FIG. 2 illustrates general time division multiplexing of communication frames. For present purposes, frames may be considered to include any signal that is limited in time duration in a manner that is recognizable to a receiving station. Data packets, or other time-limited signal blocks, may be conveyed within particular frames. For example, information packets 230, 232 and 234 may be separately provided to a multiplexer 210 on source channels 240, 242 and 244. The multiplexer 210 may sequentially output the packets 230, 232 and 234 on a single carrier 250. When conveyed by the carrier 250, the packets 230, 232 and 234 occupy nonconcurrent time slots, or frames, 270, 272 and 274, respectively. The demultiplexer 220 receives the packets 230, 232 and 234 and outputs these packets separately on receive channels 260, 262 and 264. Persons skilled in the art of wireless communications will readily understand that the method of time division multiplexing may be applied to convey frames or packets of data and pilot channel information on communication channels, such as the communication channels illustrated in the FIG. 1, in accordance with the present teachings.

The signal in a frame may be a pilot signal rather than a data signal. Thus, for example, it is possible for the carrier 250 to convey pilot signals during the time slots (frames) 270 and 274, and yet to convey a data signal, which does not serve as a pilot signal, during the time slot (frame) 272. A pilot signal typically is used (alone, or in conjunction with other information) to establish a phase reference for coherent demodulation of a different, associated channel. In the example described in this paragraph, the TDM channel(s) associated with the time slots 270 and 274 are pilot channel(s), because the signals on the carrier 250 during these slots are substantially known to, or expected by, the system that receives the outputs 260 and 264, and are used by the receiving system (in portions that are not shown) to establish a phase reference for coherent demodulation of an associated traffic channel (also not shown). In this example, a packet of data is conveyed on the non-pilot TDM channel associated with the time slot (or frame) 272, and the signal of the frame 272 is not used for any typical pilot channel purpose. Such time division of a carrier between data signal frames (e.g., 272) and pilot signal frames (e.g., 270, 274) is quite different from pilot channels that concurrently convey information, as discussed hereinbelow.

Multi-level R-SPICH

Referring again to FIG. 1, a multi-level Quadrature Phase-Shift Keying (QPSK) signaling method may used for the R-SPICH 160 to provide information about the reverse traffic channel 170. Including an "off" state in which the R-SPICH 160 is not transmitted at all, QPSK modulation of an entire R-SPICH frame provides five identifiable states. The phase reference for the QPSK modulation and demodulation of the R-SPICH may be obtained, for example, by detection of the phase of the R-PICH 150. In an exemplary embodiment, the five states that are identifiable to the receiver indicate at which of five different levels the R-SPICH is being transmitted (as compared, for example, to a level at which the R-PICH is being transmitted). The receiver may quickly decode and employ this information to permit optimal combining of frames of the R-PICH 150 and the R-SPICH 160. Thus, when the R-SPICH 160 is transmitted, it is optimally combined with the primary pilot (R-PICH) 150 to establish an improved phase reference for coherent demodulation of the reverse traffic channel 170. The information that is encoded within the R-SPICH thus conveys information to permit combining of the R-SPICH with the R-PICH.

The information provided by modulation of the R-SPICH may, alternatively or additionally, provide information about physical characteristics of the traffic channel 170. In the exemplary embodiment, for example, the level at which the R-PICH 150 is transmitted may be correlated, or mapped, with a data rate, modulation, and/or coding applied to the data on the traffic channel 170. The following is an example of an R-SPICH mapping table for an embodiment of the disclosed method and apparatus:

TABLE 1

R-SPICH Mapping Table for Exemplary Embodiment

| Sub-packet Rate (kbps) | Op-timal T/P (dB) | $P_{PILOT}$ Power Ratio (dB) | Orthogonal Code Assignment | Approx. R-SPICH Power (dB) | R-SPICH Modulation (QPSK/Off) | Approx. $P_{PILOT}$ Power Ratio (dB) |
|---|---|---|---|---|---|---|
| 38.4 | 3.6 | 0.0 | $W_4^2$ | $-\infty$ | None | 0.0 |
| 76.8 | 6.5 | 0.0 | $W_4^2$ | $-\infty$ | None | 0.0 |
| 153.6 | 9.1 | 1.12 | $W_4^2$ | −5.0 | 1 | 1.19 |
| 307.2 | 11.8 | 2.75 | $W_2^1$ | −0.5 | j | 2.7675 |
| 460.8 | 13.3 | 3.31 | $W_4^2$ and $W_2^1$ | 2.0 | −1 | 4.12 |
| 614.4 | 14.3 | 4.31 | $W_4^2$ and $W_2^1$ | 2.0 | −1 | 4.12 |
| 921.6 | 16.2 | 5.22 | $W_4^2$ and $W_2^1$ | 5.0 | −j | 6.19 |
| 1228.8 | 17.5 | 6.47 | $W_4^2$ and $W_2^1$ | 5.0 | −j | 6.19 |

TABLE 1 shows relationships between features of one exemplary embodiment. The Subpacket Rate in thousands of bits per second (kbps) is a data rate for the reverse traffic channel 170. "Optimal T/P" is the optimum ratio of the reverse traffic channel 170 power level to the sum of the R-PICH 150 power level and the R-SPICH 160 power level. "$P_{PILOT}$ Power Ratio" is an optimum ratio of the total combined transmission power of both R-PICH 150 and R-SPICH 160, divided by the transmission power of the R-PICH 150. "Orthogonal Code Assignment" indicates CDM channels that may be used to convey data at the indicated rates. This example specifies Walsh codes, with the subscript indicating the Walsh code length and the superscript indicating which particular Walsh codes of that length will be used. In the last four rows, plural Walsh channels are specified to convey more data. Any appropriate combination of channels may be used, e.g. orthogonal channels in a system such as this CDMA example, or non-CDM channels that are suitably defined for systems employing other multiplexing techniques. "Approx. R-SPICH" represents exemplary ratios of the R-SPICH 160 power level to the R-PICH 150 power level in a particular five-level system. "R-SPICH Modulation" represents exemplary QPSK modulation states that may be imposed on the R-SPICH to convey information that indicates the associated table information. "Approx. $P_{PILOT}$ Power Ratio" is an example of relative power ratios for R-SPICH/R-PICH that may be employed with a five-level system.

Thus, the five identifiable states provided on the R-SPICH by QPSK signaling, 0, 1, j, −1 and −j, may be used to indicate five different R-SPICH transmission levels, as indicated in the column headed "Approximated R-SPICH (dB)." Due to the relationships in Table 1, these identifiable states reflect a corresponding group of scenarios that are partitioned by data rates. Accordingly, each of the five states effectively specifies the traffic channel Walsh code assignment(s) and the R-SPICH transmission level, and narrows the data rate to one of two possibilities.

The discrete R-SPICH transmission levels are selected to approximate the optimal boosting level with minimal degradation. When R-SPICH boosting is needed, the R-SPICH is modulated by a modulation symbol that reflects the R-SPICH transmission level. The BS can then quickly perform a coherent detection of the R-SPICH, and upon detecting the presence of the R-SPICH, the BS determines the R-SPICH level to use for optimal combining based on the demodulated indexing symbol. Power Control may be based either solely on the non-boosted primary R-PICH, or on the combination of the R-PICH with the R-SPICH.

A five-level system is described above, the data for which may be conveyed by a QPSK phase imposition that is invariant for the duration of a frame. Of course, different numbers of power ratios may be accommodated, and the modulation technique may be changed accordingly. The modulation may also reflect alternative or additional information, especially information that facilitates decoding, demodulation, and accurate interpretation of received signals.

Data Timeliness

Relatively small data quantities may affect a relatively large number of decisions at the receiver. For example, in view of the correlations in the exemplary embodiment between transmission levels, Walsh coding and data rates, such as illustrated in TABLE 1, the modulation of the R-SPICH 160 may be seen to convey information that reflects several transmission factors of the traffic channel 170. Special "timeliness" value accrues to such information because it can be identified quickly at the beginning of a frame, when knowledge of the transmission factors can best enhance efficiency. For example, the R-PICH and the R-SPICH may be combined optimally, with relatively little delay, to serve as an effectively boosted "pilot" phase reference signal. Further, the transmission factor information may also identify the correct demodulation to apply to the signals of traffic channel 170 (or may at least reduce the number of possibilities). This information, in turn, permits the accurate demodulation of the traffic channel 170. Once the traffic channel 170 is demodulated, it requires significantly less storage space than is required to accurately retain the modulated waveform signal. Delays are also reduced.

As an example of the value of timely availability of modest quantities of information, "early" knowledge of the Walsh code usage enables the receiver to more quickly terminate unnecessary despreading operations of unused Walsh channels. If Walsh codes from the same Walsh tree are used for different rates, $W_4^3$ and $W_2^1$, for example, then an efficient receiver implementation performs 2-chip despreading before rate information is decoded. For such receiver implementations, early knowledge of Walsh code usage aids to further reduce buffer complexity, because it permits despreading of Walsh channels earlier for 4-chip Walsh channels.

Timely data may also permit realization of other valuable efficiencies. For example, upon reception, signals are typically digitized and stored until they can be processed to extract the conveyed information. Memory requirements, impacting both power consumption and memory size, may be reduced when available information permits a received traffic signal to be processed more quickly. Early determination of the parameters needed to complete decoding and/or demodulation of a high-rate data channel is therefore especially valuable. Further value may be realized in systems that use time-limited processing, such as is required for acknowledgement/retransmission techniques (e.g., H-ARQ). Early knowledge of transmission parameters may facilitate timely processing.

Many embodiments involve a channel that functions primarily as a pilot channel, such as a primary PICH or a SPICH. While any channel may be used as a pilot channel, once the signals and modulations are known, frames that primarily convey data cannot readily be employed for pilot purposes (e.g., establishing a phase reference for coherent decoding of an associated traffic channel) until significantly after the end of the frame in which they are conveyed, so that the data can be determined and compensated. As such, an exemplary embodiment of the pilot signal enhancements taught herein explicitly limits the modulation applied to pilot signal frames to modulation that can be decoded well before the end of the frame. In an alternative limitation, the modulation of the pilot signal frame is limited such that the signal of the frame may be employed as a pilot (e.g., employed to establish a phase reference for coherent decoding of an associated traffic channel) prior to a time that the frame has been completely received.

Providing a signal from which information can be quickly extracted requires a tradeoff between power, data quantity, and a required period for accurate detection. Further useful limitations may be set forth in view of the timeliness value that may attach to modest quantities of data, especially data that facilitates signal reception or interpretation. For example, information conveyed within a frame of a pilot channel may usefully be limited to that which can be determined within the first half, or the first fourth, or even the first eighth, of such frame. As the detection period decreases, a larger portion of data coincident with the frame may benefit from processing efficiencies permitted by the detected information.

In order to minimize impairment of the pilot signal functionality of a pilot signal frame, it may be useful to limit a quantity of data conveyed by such frame to one of a maximum of 32, 8 or 5 distinct states. For example, changes in modulation that are not predetermined (and thus convey new data) may be limited to once or twice in a frame, or to the first half, fourth, or eighth of the frame, or to the duration of a detection preamble period (discussed hereinbelow). In an exemplary embodiment, the QPSK phase shift not known in advance to the receiving station is applied consistently to an entire pilot signal frame. Shifts in phasing of a pilot signal frame (for conveying data not already known at the receiver) may also be usefully limited to occurrence within an initial portion of a pilot frame, which may be matched to one or two pilot filter lengths.

A modest penalty to an initial effectiveness of a combined-channel pilot phase reference is typically experienced due to the initially uncertain phase relationship between the two pilot signals, and during this time the two signals may need to be stored as a sequence of samples. However, after a short delay while the phase relationship is reliably established, the effectiveness of the combined pilot is restored. Savings in signal processing requirements, such as reductions in signal storage requirements and in unnecessary decoding efforts, are permitted by the improvements in the pilot signal effectiveness, and by the information that permits prompt demodulation of the traffic channel(s) 170. These savings are much greater than the modest signal storage penalty incurred in order to determine a modulation of the R-SPICH prior to combining the R-PICH and R-SPICH. In other circumstances and systems, however, different transmission factors, and/or different modulation techniques, may provide more suitable tradeoffs in performance.

Detection Preamble Period

Figure 3:
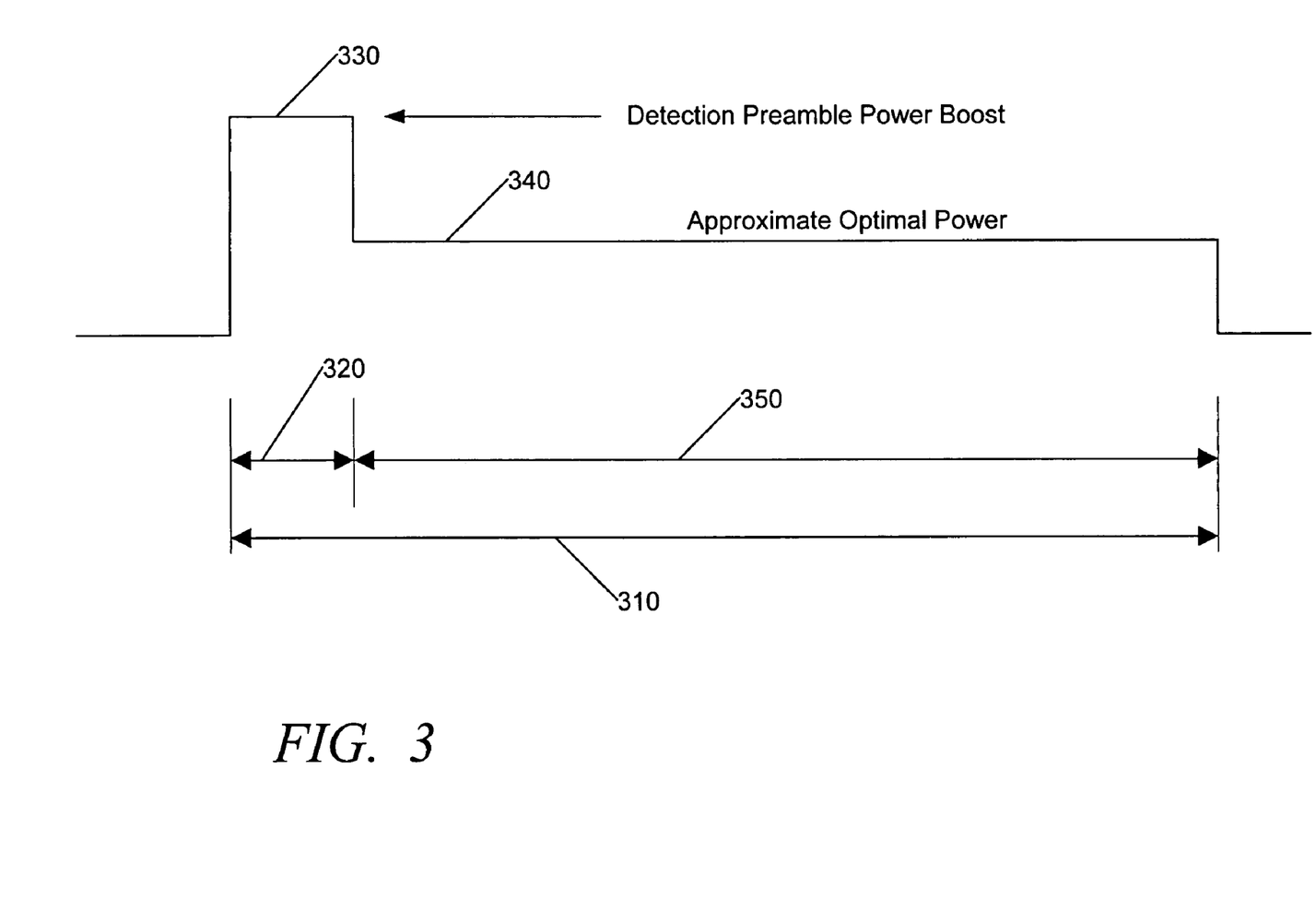
FIG. 3 is a diagram of exemplary timing for a pilot channel frame, showing a boosted power level during a detection preamble period and an approximately optimal power level following the detection preamble.

FIG. 3 illustrates features of a frame 310, of a channel such as the R-SPICH, which is transmitted at a plurality of power levels. To ensure reliable detection of the presence and modulation state of the frame, an initial portion 320 of the frame 310 may be transmitted at a special detection preamble power level $P_p$ 330 that is optimized for detection. While this portion is sometimes referred to as simply a "preamble," it should not be confused with other types of preambles, such as are prepended to data packets or frames in some wireless systems, and which are generally dissimilar from the instant detection preamble. Other preambles typically function for temporal alignment of the frame to which they are prepended, and indeed may serve as a separate time-multiplexed pilot signal frame prepended to a data frame. However, the instant "detection preamble" primarily functions to enhance detectability of the frame and/or its modulation state(s). The entire frame typically serves as a pilot signal.

FIG. 3 illustrates a circumstance in which the detection preamble period 320 is one eighth of the total frame period 310. This may be the case, for example, when a two-PCG detection preamble period (1.25 ms each, for a total of 2.5 ms) is employed with a 20 ms R-SPICH frame, or a one-PCG detection preamble period is employed with a 10 ms frame length. However, the detection preamble may constitute any portion of the frame duration that is consistent with other engineering considerations. During the time period 350, the R-SPICH frame 310 is transmitted at an approximately optimal power level 340, which may be selected according to the examples presented TABLE 1. The detection preamble transmission level 330 may be pre-optimized for detection performance. Thus, for example, the R-SPICH may be transmitted at the highest of its multiplicity of transmission levels during the detection preamble period 320, a level that is anticipated by the receiving station. At the end of the detection preamble period, the transmission level of the R-SPICH may be reduced to an optimum level 340 for the remaining period 350 of the frame 310. Of course, either additional or fewer power level periods may be employed.

In one embodiment, an optimal R-SPICH power level is transmitted after the detection preamble period. For longer frames, such as a preferred 20 ms, the detection preamble period is relatively quite short, and thus most of the data still enjoy the benefit of an approximately optimal R-SPICH power level. Because R-SPICH boosting is needed only for higher data rates requiring a high T/P, 3-6 dB (5 dB is the recommended maximum boost in the present example) of R-SPICH power relative to the R-PICH level during the detection preamble period will not create excessive transmission power peaks.

In one embodiment, a ramp up/down transition period may be required for pilot filtering purposes. The resulting additional discontinuity of the R-SPICH level introduces only transitional degradation. The additional delay due to coherent detection should be small, and may be approximately half of the pilot filter length. Furthermore, because the ratio of the two transmission levels is known after the detection preamble modulation is determined, the difference can be compensated to avoid degradation for nonzero frequency error cases at the expense of some noise distortion. The signal-to-noise ratio (SNR) is better than the case of using optimal R-SPICH power level continuously. SNR of the compensated pilot filter output is as follows:

$$SNR = SNR_0 \frac{P_p/P_o}{N_p/N + (1 - N_p/N)P_p/P_o} \quad (1)$$

where:

$$SNR_o = \frac{P_o}{\sigma^2}\left(\frac{\sin(\omega(N+1)T/2)}{\sin(\omega T/2)}\right)^2 \quad (2)$$

is the SNR using the approximately optimal R-SPICH power level. The following definitions apply in the equations (1) and (2) above: $P_O$ is the optimal R-SPICH 160 transmission power level; $P_p$ is a detection preamble period transmission level; N is the pilot filter length; $N_p$ is the number of symbols used in the pilot filter window; T is the symbol duration. $\sigma^2$ and $\omega$ comprise, respectively, noise power after despreading, and residual frequency error.

From equations (1) and (2), it is easy to see that the following relations apply:

$$SNR_o \le SNR \le SNR_o \frac{P_p}{P_o} = SNR_p \quad (3)$$

where $SNR_p$ is the SNR using only the detection preamble R-SPICH power level. Therefore, the SNR is still better than the case of continuously transmitting at the optimal R-SPICH power level.

When QPSK modulation of the R-SPICH channel is used, as in the present example, the sometimes non-zero phase of the R-SPICH can be effectively removed at the receiver using a simple switching and negation process without requiring complex multiplication. Once the Rate Indicator Channel (RICH) is demodulated (in a cdma2000 system), consistency between QPSK R-SPICH information and RICH rate information can be used to determine if a particular sub-packet should be used for the Hybrid Automatic Retransmission Request (HARQ).

The detection preamble period may, as noted, be transmitted at an elevated power level to ensure correct detection. It may be desirable to limit changes in modulation of a pilot signal that reflect new (not previously known to the receiver) data to a detection preamble portion of the frame, if used. Such limitation will aid in early recognition of information thus transmitted, both because such modulations are therefore physically disposed on the signal during an early portion of the frame, and because the modulations may be made more promptly and correctly detectable by increased transmission power. For similar reasons, it may be useful to maintain a constant modulation after a detection preamble, or after a certain portion (such as ¼) of a pilot signal frame. Indeed, it may be useful to terminate any modulation of the pilot signal at all after the detection preamble (or arbitrary "early" portion of the frame, such as ¼, ⅓, ⅛ or ½). Thereby, occasional errors in detection of the pilot signal modulation will not lead to incorrect conclusions about the phasing of the pilot signal during the bulk of the pilot frame. Also, receiver detection of the modulation applied to an initial portion of a pilot signal frame (e.g., a detection preamble portion) may be based, in part, on recognition of a transition from modulated to unmodulated at a known (predetermined) transition point.

Transmitting Station Features

Figure 4:
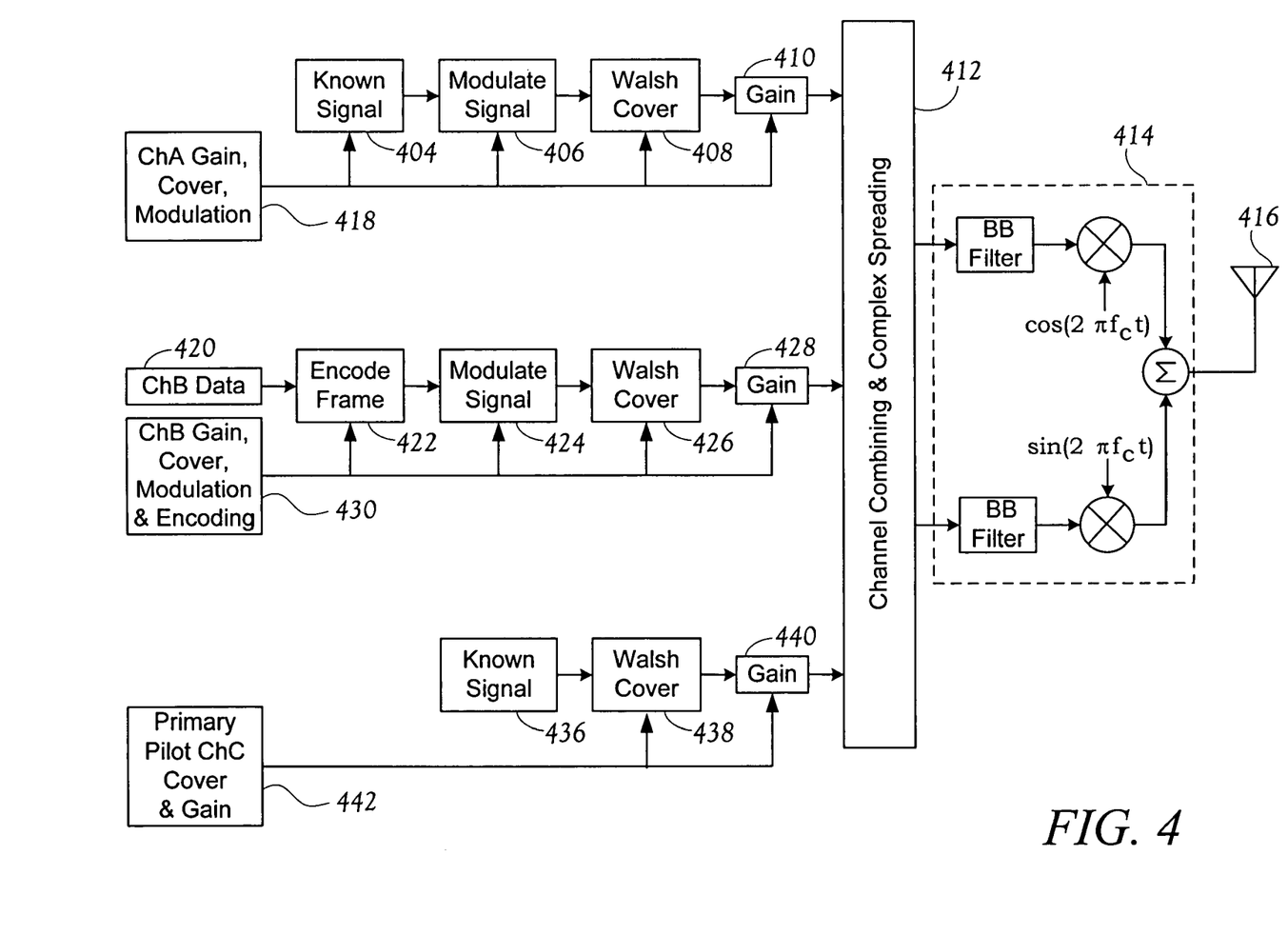
FIG. 4 is a block diagram of features of a transmitting station that may be controlled to effect the enhancements described herein for pilot signals and/or general signal combining.

FIG. 4 illustrates features that may be provided to implement the pilot signal enhancements described herein in a CDMA system transmitting station. Signal preparation is shown for a channel A (which may, for example, be a SPICH), a channel B (which may, for example, be a traffic channel associated with channel A), and for a primary pilot channel C. According to one exemplary embodiment, channel A is a secondary pilot channel that is prepared based upon block 404, a sequence or signal that is known to the receiver. Block 404 may, for example, simply produce a constant "1," "0," or "−1," particularly in CDMA systems, though other predetermined sequences are also consistent with this embodiment.

At a block 406, the signal may be modulated to reflect new information, such as the gain, transmission power level, or other parameters regarding channel A, or transmission parameters for channel B, as described below. The modulation in block 406 may be controlled by a channel parameter control block 418 to reflect information that is not known at the receiver. Such information may include relevant channel parameters, such as are provided by the blocks 418 and 430. Limitations on the applied modulation may be imposed to protect effectiveness of channel A for pilot purposes (such as generating a phase reference for an associated traffic channel). For example, the quantity of data conveyed by such modulation may be limited, as may other characteristics, such as the types of modulation and the temporal positions within a frame at which information-bearing modulation changes may occur.

In a block 408, an appropriate Walsh cover (or other orthogonal channel coding) is imposed to channelize the signal as channel A, also under control of the block 418. After the channel A signal is multiplied by a selected gain in a gain block 410 (under control of block 418), it enters a combining and complex spreading block 412, where it will be combined with other channel signals. The combined and spread channels from the block 412 will be baseband filtered and complex modulated to carrier center frequency in a transmission control block 414, and the sum of such signals will be applied to an antenna 416 (transmission details such as power amplification are not shown).

Channel B may be a data channel, and as such will have a data source such as a queue in a block 420. In general, encoding applied to establish a frame of data in a frame encoding block 422 may be selected on a frame-by-frame basis. Indeed, in the case of data packets, such encoding may even vary from portion to portion of the packet. For example, a packet header may be encoded using a first encoding scheme, while a payload of the packet is encoded using a different encoding scheme. Instruction as to the correct encoding scheme(s) may be provided from a block 430, together with other channel preparation control signals that are appropriate for data channel B. Such other channel control information provided by block 430 may direct application of an appropriate modulation technique in a block 424, an appropriate orthogonal channelization cover in a block 426, and an appropriate gain for the channel in the block 428. It may be useful to reflect any or all of these channel B control parameters by the modulation applied to channel A in block 406, particularly if such information permits more efficient processing of channel B by the receiver. After channel B has thus been prepared, it is combined with others in the combining block 412, similarly as for channel A and for a primary pilot channel C.

Channel C may be a primary pilot channel. Accordingly, the signal source may usefully provide, in a block 436, a signal or sequence that is known at the receiver. Such signal may be a simple constant, at least when the pilot is being transmitted. A Walsh (or other orthogonal) cover may be applied in a block 438, which may be under control of channel parameters provided in a block 442. However, as a primary pilot channel the Walsh "cover" may be fixed and predetermined, for example "Walsh zero." Gain control will typically be applied in a block 440, also under control of the block 442 channel parameters. Thereafter, the channel signal is combined in the block 412, and further prepared for transmission similarly as channel A and channel B.

In implementation, of course, channels A, B and C may have identical capabilities, with unneeded capabilities (such as a data queue for pilot channels A or C) not employed. In such an implementation, channel A might, for example, be used for data channel transmission at some times when it is not needed for pilot purposes.

An exemplary embodiment of pilot signal enhancements may require only channels A and B, where channel A is a pilot channel and channel B is a corresponding traffic (e.g., user data) channel. Pilot channel A will typically be transmitted from the transmitting station (e.g., an MS) to provide a phase reference to a receiving station (e.g., a BS) for coherent demodulation of traffic channel B. Pilot channel A may be modulated in different ways in the block 406, such as by amplitude modulation at certain transition times of the frame, or by phase modulation of one portion of the frame with respect to another portion of the frame. Amplitude modulation may also be effected by timely adjustment of gain within the block 410. These, or other, modulation schemes may be used to convey modest amounts of information, preferably detectable even before an entirety of the information-conveying pilot frame has been received at the receiver. The conveyed information may indicate, as examples, a data rate, data encoding scheme, signal modulation, or other transmission characteristics for the corresponding traffic channel B. Timely interpretation of the modulation applied to pilot channel A may permit efficiencies in the demodulation and decoding, at the receiving station, of data on traffic channel B.

In another embodiment, pilot channel A may be a secondary pilot channel that is employed as needed to increase an effectiveness of a primary pilot channel, which may be channel C. The receiving (e.g., BS) station may be expected to combine concurrent frames of pilot channels A and C so as to provide a phase reference for coherent demodulation of traffic channel B. The pilot channel A may be modulated in the block 406 to indicate information that may assist the receiving station to more efficiently perform such combining. In an exemplary version of this embodiment, the secondary pilot channel A may be transmitted at a variable power ratio with respect to the primary pilot channel C, by means of appropriate selection of gain in the gain block 410. The information indicated by the modulation of the secondary pilot channel A may reflect the selected transmission power ratio. Prompt detection of the information, by the receiving station, may permit combining of the primary and secondary pilot signals that is both timely (due to early availability of the ratio information) and optimized in view of such relative power.

Other Embodiments—Extension to Other Applications

For applications that can tolerate a slightly longer latency, in order to accommodate the difference in transmitted levels for different modulation symbols, the constellation points can be further optimized for better detection probability. An example of such an embodiment may be described with further reference to FIG. 1. If only three (3) R-SPICH 160 power levels are used (e.g., power level S0 <power level S1 <power level S2), the modulation symbols corresponding to these levels may be defined as follows: modulation symbol −j corresponding to power level S0, modulation symbol 1+j corresponding to power level S1, and modulation symbol −1+j corresponding to power level S2. Alternatively, BPSK may be used, with an "off" state, to indicate the three power levels.

Techniques described herein may be employed with non-pilot channels, particularly if it is desired to optimally combine a frame of one channel (e.g., channel A) with a frame of another channel (e.g., channel B). Referring again to FIG. 4, channel A may be alternatively configured to convey data. For example, instead of receiving a signal that is known to the receiver from block 404, the modulation block 406 of channel may accept a previously modulated signal from the block 424 of channel B, possibly with an appropriate time delay to effect time diversity. Channel A may be transmitted at a variety of power ratios with respect to channel B, as needed. Channel A may, however, be modulated in the block 406, such that the net modulation of channel A is from that of channel B. The difference may reflect information that will facilitate combination of the corresponding frames of channels A and B. For example, channel A may be shifted in phase, compared to channel B, with respect to a phase reference. Such phase shift may constitute binary or quadrature phase shifting of channel A with respect to channel B. Once the difference is detected, reflecting information (such as relative transmission power) that will aid combining, the two channels can be optimally combined. Similarly as described previously with regard to combining pilot channels, a different transmission power and/or modulation may be employed during a detection preamble portion of a frame of channel A.

Persons skilled in the art of wireless communication will understand that the present teachings may applied to other types pilot signals, (e.g., to forward pilot channels), and more generally to any signals that facilitate reception of other communication channels. Likewise, other modulation methods (e.g., amplitude modulation methods, whether combined or not with phase shift modulation methods, and phase shift modulation methods other than the BPSK and QPSK that are discussed above, may be employed in accordance with the present teachings.

CONCLUSION

The foregoing description illustrates exemplary implementations, and novel features, of a method, apparatus, or system that enhances the effectiveness of a pilot signal in a wireless communication system, or of channel combining generally. Generally, information may be conveyed that permits more effective combining of signal frames in order to improve an estimate of the phase reference, or of the data, that is conveyed by the signals. However, a pilot signal that is used for generating a phase reference for coherent demodulation of an associated traffic channel may be modulated to convey any useful information, especially information that facilitates efficient estimation of the traffic channel data. Although various alternative implementations are suggested, it is impractical to list all such alternatives. As such, the scope of the presented invention should be determined only by reference to the appended claims, and should not be limited by features illustrated in the foregoing description except insofar as such limitation is recited in an appended claim.

While the above description has pointed out novel features of the invention as applied to various embodiments, the skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention may properly be defined only by the appended claims, rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method of receiving information in a wireless communications system, comprising:
    a) receiving a pilot signal frame at a receiving station via a pilot channel transmitted by a transmitting station;
    b) deriving a phase reference for coherent demodulation of at least one associated non-pilot wireless communication channel transmitted by the transmitting station, based at least in part on timing alignment of the pilot signal of the frame; and
    c) analyzing a modulation imposed by the transmitting station of the pilot signal of the frame, which is not predetermined as to the receiving station, to obtain information from the transmitting station;
    wherein step (b) and/or step (c) is performed before an entirety of the pilot signal frame has been received in step (a).

2. The receiving method of claim 1, further comprising time division demultiplexing common carrier signal to distinguish a frame of the pilot channel disposed in a first time slot of the common carrier signal from a frame of a non-pilot channel conveyed on the common carrier signal during a nonconcurrent second time slot.

3. The receiving method of claim 1, wherein the information obtained from the transmitting station reflects one or more variable transmission characteristics of a frame transmitted from the transmitting station to the receiving station.

4. The receiving method of claim 3, further comprising employing the obtained information for deriving the phase information in step (b).

5. The receiving method of claim 3, wherein the obtained information reflects a relative transmission power level of the pilot signal.

6. The receiving method of claim 1, further comprising demodulating the pilot signal frame based upon phase encoding.

7. The receiving method of claim 6, further comprising demodulating the pilot signal according to BPSK or QPSK.

8. The receiving method of claim 1, further comprising demodulating amplitude of the pilot signal.

9. The receiving method of claim 1, wherein the pilot signal frame is a first pilot signal frame, further comprising receiving a different second pilot signal frame from the transmitter via a different pilot channel.

10. The receiving method of claim 9, further comprising deriving the phase reference at least in part from the second pilot signal frame.

11. The receiving method of claim 10, further comprising combining the first and second pilot signals based at least in part on the obtained information.

12. The receiving method of claim 10, further comprising determining a transmission power level ratio between the first and second pilot signal frames from the obtained information.

13. The receiving method of claim 1, further comprising identifying different transmission power levels during corresponding different time segments of the pilot signal frame.

14. The receiving method of claim 1, further comprising determining the phase reference based at least in part upon a predetermined relative transmission power level of the pilot signal during a first time portion of the pilot signal frame.

15. The receiving method of claim 14, further comprising determining the phase reference based at least in part upon a different relative transmission power level during a second time portion of the pilot signal frame.

16. The receiving method of claim 15, further comprising determining an expected value for the different relative transmission power level from an identified modulation of the pilot signal during the first time portion of the pilot signal frame.

17. The receiving method of claim 1, further comprising establishing a phase reference based on a portion of the pilot signal frame before an entirety of the pilot signal frame has been received.

18. The receiving method of claim 1, further comprising determining information conveyed by modulation of a pilot signal frame before an entirety of the pilot signal frame has been received.

19. The receiving method of claim 18, further comprising determining information conveyed by modulation of the pilot signal frame before one fourth of the pilot signal frame has been received.

20. The receiving method of claim 1, wherein not more than two distinct time portions of the received pilot signal frame are analyzed for different information that is not known in advance to the receiver.

21. The receiving method of claim 1, wherein the pilot signal frame is received via a secondary pilot channel (SPICH), further comprising:
  d) receiving a pilot signal via a different primary pilot channel (PICH);
  e) interpreting the obtained information from the SPICH to identify a transmission power level ratio between the SPICH and the PICH; and
  f) combining the SPICH and the PICH in accordance with the identified transmission power level ratio to establish the phase reference for coherent modulation.

22. The receiving method of claim 21, further comprising (g) combining the SPICH and the PICH, during a first portion of a frame of the SPICH, in accordance with a predetermined boost transmission power level ratio different from the ratio identified in step (e).

23. The receiving method of claim 22, further comprising selectably matching a length of a filter for the SPICH to a length of the first time portion of step (g).

24. The receiving method of claim 21, further comprising estimating transmission channel characteristics based upon optimal ratio combining of the SPICH and the PICH.

25. The receiving method of claim 24, further comprising identifying, based on the obtained information, a limited range of data rates and a limited range of coding schemes for the other non-pilot wireless communication channel transmitted by the transmitting station.

26. The receiving method of claim 1, wherein the information received from the transmitter changes while the receiver remains in communication with the transmitter.

27. The receiving method of claim 26, further comprising time division demultiplexing a common carrier signal to distinguish a frame of the pilot channel disposed in a first time slot of the common carrier signal from a frame of a non-pilot channel conveyed on the common carrier signal during a nonconcurrent second time slot.

28. The receiving method of claim 26, wherein the obtained information reflects a relative transmission power level of the pilot signal.

29. The receiving method of claim 26, further comprising demodulating the pilot signal according to BPSK or QPSK.

30. The receiving method of claim 26, wherein the pilot signal frame is a first pilot signal frame, further comprising receiving a different second pilot signal frame from the transmitter via a different pilot channel and deriving the phase reference at least in part from the second pilot signal frame.

31. The receiving method of claim 30, further comprising combining the first and second pilot signals based at least in part on the obtained information.

32. The receiving method of claim 30, further comprising determining a transmission power level ratio between the first and second pilot signal frames from the obtained information.

33. The receiving method of claim 30, further comprising identifying different transmission power levels during corresponding different time segments of the pilot signal frame.

34. The receiving method of claim 30, further comprising combining the pilot signals and determining the phase reference based at least in part upon a predetermined relative transmission power level of the pilot signals during a first time portion of the pilot signal frame.

35. The receiving method of claim 34, further comprising: determining a different relative transmission level of the pilots for a second time portion of the pilot signal frame based on modulation of the first pilot signal during the first time portion; and combining the pilot signals and determining the phase reference during the second time portion, based at least in part upon such different relative transmission power level.

36. The receiving method of claim 1, further comprising determining information conveyed by modulation of a pilot signal frame, which information has changed since an immediately preceding frame, before an entirety of the pilot signal frame has been received.

37. The receiving method of claim 36, further comprising determining information conveyed by modulation of the pilot signal frame before one fourth of the pilot signal frame has been received.

* * * * *